(12) United States Patent
French

(10) Patent No.: US 9,039,054 B1
(45) Date of Patent: May 26, 2015

(54) LOAD LAUNCHING SHOVEL

(76) Inventor: Donald L. French, Greene, NY (US)

(*) Notice: Subject to any disclaimer, the term of this patent is extended or adjusted under 35 U.S.C. 154(b) by 0 days.

(21) Appl. No.: 13/366,635

(22) Filed: Feb. 6, 2012

(51) Int. Cl.
*A01B 1/22* (2006.01)
*A01B 1/02* (2006.01)

(52) U.S. Cl.
CPC ..................... *A01B 1/026* (2013.01)

(58) Field of Classification Search
USPC .............. 294/49, 54.5, 58, 55; 15/257.7; 172/372, 381; 403/91–94, 96, 97, 103
See application file for complete search history.

(56) References Cited

U.S. PATENT DOCUMENTS

| | | | |
|---|---|---|---|
| 881,782 A * | 3/1908 | Elliott | 294/51 |
| 1,427,865 A * | 9/1922 | Szabo | 294/53.5 |
| 1,741,004 A * | 12/1929 | Wornstaff | 294/53.5 |
| 3,115,359 A * | 12/1963 | Hendrick | 294/53.5 |
| 5,533,768 A | 7/1996 | Mitchell | |
| 6,203,081 B1 | 3/2001 | Kegan | |
| 6,315,341 B1 * | 11/2001 | Leon et al. | 294/53.5 |
| 6,663,085 B1 | 12/2003 | Dalon | |
| 6,704,968 B2 | 3/2004 | Lau | |
| 6,922,920 B1 | 8/2005 | Stratz | |
| 7,559,591 B1 | 7/2009 | Desanti | |

* cited by examiner

*Primary Examiner* — Paul T Chin
(74) *Attorney, Agent, or Firm* — Mark Levy; Hinman, Howard & Kattell, LLP

(57) ABSTRACT

A hand operated shovel system for moving materials that uses spring enhanced human power to increase force during the flinging part of shoveling. A user adds propulsive force to a shovel having a spring located between the handle and the blade. Motion of the handle and blade rotates the spring to store energy expended during the initial acceleration of lifting, and applies the stored energy back into the material during the deposition step, increasing the ballistic trajectory of the material. If material deposition can be accomplished without flinging, the shovel acts as a substantially rigid body for standard shoveling.

20 Claims, 9 Drawing Sheets

LOAD LAUNCHING SHOVEL

FIELD OF THE INVENTION

The invention pertains to human powered shovels generally used for shoveling objects and, more particularly, to such a shovel that propels objects being shoveled when the user desires to deposit the load at a distance from his present location.

BACKGROUND OF THE INVENTION

Historically, when an object was deemed to require movement, the object was moved by hand and placed in a new position by the individual desirous of the move. Similar behavior can be seen in animals that dig holes or break ground to reach a food source located under the surface of the ground. As time passed, objects requiring movement became bigger, heavier, and more numerous, while people continued the development of stone and metal tools used for shelter and hunting. Archeologists have uncovered sites containing tools dating to antiquity, and it follows a progression of the ability of humans to create new and better tools.

The dawn of time and tool development happened concomitantly, and proceeded for a long period time without needing an ergonomic analysis of every new task to facilitate the approval of every new invention designed. One such tool is the shovel, a tool for digging, lifting, and moving bulk materials, such as soil, coal, gravel, snow, sand, or ore. Shovels are extremely common tools used extensively in agriculture, construction, and gardening. Most shovels are hand tools consisting of a broad blade with edges or sides that are fixed to a medium-length handle. The blades are commonly made of sheet steel or hard plastic. Shovel handles are usually made of wood, especially specific varieties such as ash or maple, or a glass-reinforced plastic such as fiberglass.

Hand shovel blades made of sheet steel usually have a folded seam or hem at the back to make a socket for the handle. This fold also provides extra rigidity to the blade. The handles are usually riveted in place and a T-piece is commonly fitted to the end of the handle to aid grip and control where the shovel is designed for moving soil and heavy materials. The term shovel is also applied to larger excavating machines called power shovels, which are designed for the same purpose, namely, digging, lifting, and moving material. Modern power shovels are the descendants of steam shovels.

Hand shovels have been adapted for many different tasks and environments. They can be optimized for a single task or designed as crossover or compromise multitaskers. Many current discussions of shovel use revolve around the shoveling of snow, sometimes referred to as a white scourge of the upper latitudes. Many scholarly articles describe the result of too much, or too fast snow shoveling, not enough warm up exercise, low liquid intake and improper body motion during shoveling, and so on. The fact that snow has been falling since time immemorial has not dampened the interest in the design of shovels, sometimes with no regard to the well being of the user.

Recently, more than 118,000 people in a calendar year were treated in hospital emergency rooms, doctors' offices, clinics and other medical settings for injuries that happened while shoveling or removing ice and snow manually. Additionally, more than 16,000 were injured using snow blowers. Types of injuries resulting from shoveling and snow blowing can include sprains and strains, particularly in the back and shoulders, as well as lacerations and finger amputations.

Warnings regarding shoveling include: always speak with your doctor before shoveling because this activity places high stress on the heart, and dress appropriately in light, layered, water-repellent clothing that provides both ventilation and insulation. Also important is wearing appropriate head coverings, as well as mittens or gloves and thick, warm socks. Clear snow early and often by beginning to shovel when a light covering of snow is on the ground, to avoid dealing with packed, heavy snow. Do not throw the snow over your shoulder or to the side. This requires a twisting motion that stresses your back. Be sure you can see what you are shoveling. While not exhaustive, the listing above serves as a reminder that snow shoveling is a serious and can be a potentially harmful business.

Some aspects of proper shovel use are having a shovel that is comfortable for a person of a given height and strength, and having a shovel that is neither too heavy nor too long. Placement of hands with as much space between them on the tool grip increases leverage. Push the snow instead of lifting it. Scoop small amounts of snow into the shovel and walk to where it is to be dumped. Holding a shovelful of snow with ones arms outstretched places extra stress on the spine. As can be observed, many factors must be considered when shoveling snow, but such factors also apply to shoveling dirt, sand, rocks, and other objects and materials.

DISCUSSION OF THE RELATED ART

U.S. Pat. No. 6,203,081 for EASY LIFT LEVERED SHOVEL, issued Mar. 20, 2001, to Kegan, discloses a shovel with a pan connected to an end handle by a shaft. A lever is attached to the shaft to assist in lifting a load. The lever has an L-shaped member and a portion of the L-shaped member is received in the bight portion of a spring. The lever preferably is resiliently attached to the shaft and returns automatically to a position adjacent to the shaft when the load on the shovel is emptied.

U.S. Pat. No. 6,663,085 for PORTABLE HAND-OPERATED LIFTING DEVICE, issued Dec. 16, 2003 to Dalon, discloses an apparatus for lifting, having a lever arm attached to a plate that can be temporarily fixed by an operator, and having a lifting head that can be swiveled and rotated relative to the plate. The lifting device includes a lifting head and a lifting arm having a handle at the end opposite the lifting head. A lever arm is attached between the lifting head and the lifting arm. The lever arm is pivotably and swivelly connected to a cleated foot plate. In one embodiment, the distance between the handle grip and the lifting head can be extended or shortened. In another embodiment, the angle of the lifting handle relative to the lifting arm is adjustable.

U.S. Pat. No. 6,922,920 for SNOW REMOVAL DEVICE, issued Aug. 2, 2005 to Stratz, discloses a snow removal apparatus in the form of a shovel in which a leveraged arrangement is used to lift snow gathered on the shovel blade by lateral movement of such blade while supported by a handle adjustably secured upon the blade and the shovel handle is rested upon an underlying surface while snow is being lifted and moved to a dumping area by leveraged foot movement upon a pivot arm pivoted upon the handle and attached to the blade, thus avoiding strain on a shoveler's arms and spine.

U.S. Pat. No. 7,559,591 for SNOW SHOVEL WITH FLEX CONTROL MECHANISM, issued Jul. 14, 2009 to Desanti, discloses a snow shovel including a middle portion interposed between, and coupled to, each of a blade portion and a handle portion. Included with the middle portion is a flex control mechanism structured for controlling an amount of downward flexing possible by the blade portion with respect to the handle portion. While collecting a volume of snow, the blade portion is maintained and biased in a first normal position. When lifting a volume of collected snow, the blade portion flexes downwardly, possibly assuming a pre-established second fully flexed position. When the collected and lifted snow is tossed, the energy stored in the flexible member by the downward flexing helps assist in tossing the snow.

U.S. Pat. No. 6,704,968 for AUXILIARY HANDLE ATTACHABLE TO TOOLS FOR MOVING BULK MATERIAL, issued Mar. 16, 2004 to Lau, discloses an auxiliary handle attached to a tool having an elongated handle. The auxiliary handle has a shaft with a gripping yoke at one end for manual gripping. At the opposite end of the shaft a contact surface is positioned which interfaces with the tool handle in abutting relationship. A clamp is positioned facing the contact surface for clamping the contact surface against the tool handle. The contact surface is angularly disposed so as to permit the auxiliary handle to be angularly oriented with respect to the tool handle. The contact surface is divided into two contact faces, which engage the tool handle in spaced relation to each other. The clamp has a clamping piece with a contact region also divided into spaced apart contact surfaces for engaging the tool handle. The clamping piece is bolted to the shaft and a cross bolt and clip hold the attachment bolts to the sides of the shaft.

U.S. Pat. No. 5,533,768 for ERGONOMIC SHOVEL, issued Jul. 9, 1996 to Mitchell, discloses a shoveling tool with a flexible portion at the base of the handle that helps prevent the risk of injury when shoveling by absorbing the initial shock when digging or by adjusting gradually to a different load when shoveling.

None of the aforementioned patents, taken singly, or in any combination, is seen to teach or suggest a torsion spring augmentation of accelerated delivery from a shoveling device, while also being capable of standard push shoveling. A torsion spring system would allow stored potential energy to be expended in the propelling of shoveled objects instead of being absorbed by the user.

It is, therefore, an object of this invention to provide a load launching shovel that facilitates and enhances the efficiency with which deposition of shovel worthy objects is administered.

It is another object of the invention to provide the user of a load-launching shovel with a selection of torsion spring options to allow utilization by all sizes and strengths of individuals.

It is another object of the invention to provide the user of a load launching shovel with a selection of torsion spring adjustment options to accommodate deposition of various consistencies of shovel worthy objects, be they heavy, light, bulky or airy.

It is an object of the invention to provide a plurality of torsion springs to negate a need for separate individual shovels due to varying sizes of users.

SUMMARY OF THE INVENTION

In accordance with the present invention there is provided a portable hand held shovel for moving small amounts of earth, debris, or snow, to name but a few items, where the hand held shovel may include a handle having a spring attached thereto for coupling and decoupling the blade of a shovel. The portable hand held shovel generally contains a handle, an adjustable spring assembly, and a shovel blade suitably contoured for the work to be performed. The spring assembly adjustment allows for the shovel to be utilized for shoveling stone, and being able to launch and propel the stone farther than a standard shovel can fling it. Likewise, the shovel can be used to shovel snow and to propel it a greater distance than would result from simple flinging it with a stiff shovel. Many other objects having various densities and consistencies can be handled with the inventive shovel.

BRIEF DESCRIPTION OF THE DRAWINGS

Various objects, features, and attendant advantages of the present invention will become more fully appreciated as the same becomes better understood when considered in conjunction with the accompanying figures, in which like reference characters designate the same or similar parts throughout the several views, and wherein.

DETAILED DESCRIPTION OF THE PREFERRED EMBODIMENT

Figure 1:
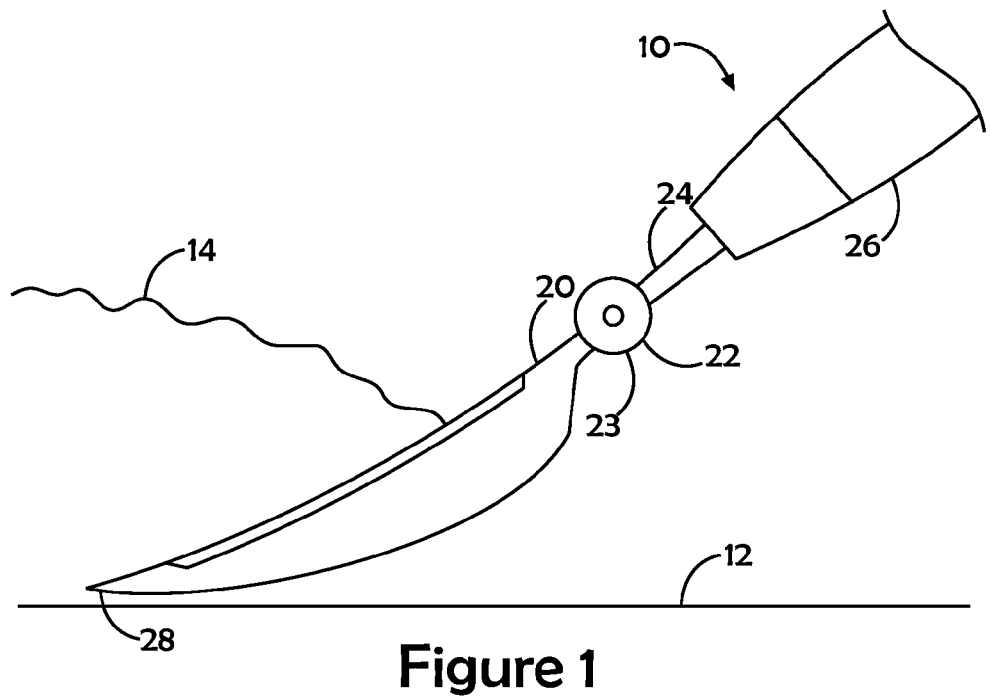
FIGS. 1 and 2 are side views of a spring assisted shovel in accordance with the present invention.
Figure 2:
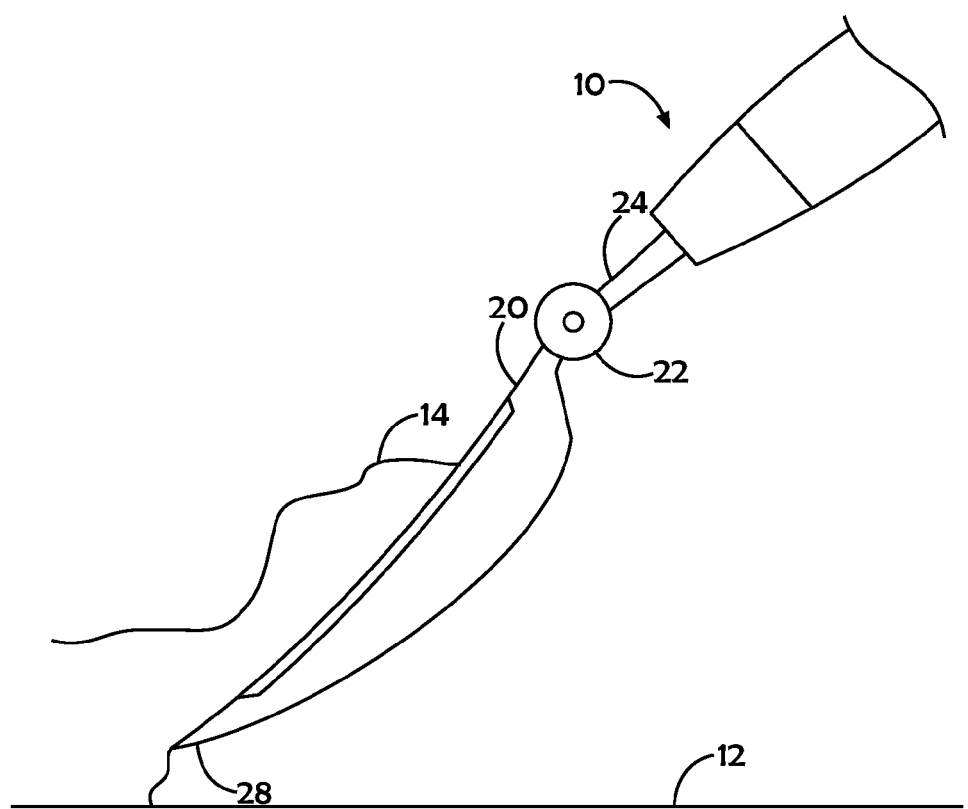

The present invention provides a portable hand held shovel for moving small amounts of earth, debris, or snow, where the hand held shovel may include a handle having a spring attached thereto for coupling and decoupling the blade of a shovel. The spring assembly adjustment allows the shovel to move stone, and to launch and propel the stone farther than a standard shovel can fling it. Likewise, the shovel can be used to shovel snow and to propel it a greater distance than simple flinging it with a stiff shovel. The ability to utilize various spring types via a simple hardware change allows customization of the shovel to the specific job at hand. The portable hand held shovel generally contains a handle, an adjustable spring assembly, and a shovel blade contoured according to the work to be performed Referring now to FIGS. 1 and 2, there are shown side views of spring assisted shovel 10, with shovel 10 having blade 20, handle 26, and helical torsion spring 22 as main components. FIGS. 1 and 2 show the common embodiments of a spring assisted shovel, where spring 22 is located on a hinge shaft 23 of a T-rod 24, which is the connection between handle 26 and blade 20. Spring 22 facilitates storage and output of potential energy created during the shoveling motion. In normal use, blade tip 28 contacts lower surface 12 of the current environment wherein the shovel 10 is utilized. Such lower surface 12 may be a sidewalk or driveway if one is shoveling snow 14, as in the current embodiment. If snow 14 is too deep for shovel 10 to aggregate a pile 16, it can be inserted directly into the pile above lower surface 12, with motion subsequent consistent with the description hereinbelow (FIG. 2).

With blade tip 28 moving along the lower surface 12, snow 14 is pushed into an aggregate pile 16 ahead of shovel blade 20. Aggregate pile 16 increases in size and density as force is applied. Depending on the style of the person shoveling, spring 22 can stay neutral in tension around hinge shaft 23, and act as a solid shaft since there are no bending moments being applied to the ends of spring 22.

As aggregate pile 16 begins to grow to an acceptable size, determined by moisture content of the snow, depth of the snow, and other factors specific to the shovel load desired, the operator (not shown) begins to lift (FIG. 2) spring assisted shovel 10 off lower surface 12. As upward motion is applied, spring 22 begins to rotate due to the movement of handle 26 upward, and Newton's laws of motion are followed as the aggregate pile 16 is lifted. Newton's First Law states that an object at rest will stay at rest unless an unbalanced force acts upon it; and an object that is in motion will not change its velocity unless an unbalanced force acts upon it. The person is applying the unbalanced force, and Newton's Second Law states the change of momentum of a body is proportional to the impulse impressed on the body, and happens along the straight line on which that impulse is impressed.

Again, a person applies an impulse force as he accelerates the aggregate pile 16 on spring assisted shovel 10 off of lower surface 12. Some of the energy input by the impulse force is stored as potential energy within spring 22 according to Hooke's law of elasticity. Torsion springs obey an angular form of Hooke's law, which is an approximation that states that the extension of a spring is in direct proportion to the load applied to it. Spring materials generally obey this law as long as the load does not exceed the material's elastic limit. Newton's Third Law states to every action there is an equal and opposite reaction. Stated another way, the forces of two bodies on each other are equal and in opposite directions.

Figure 3A:
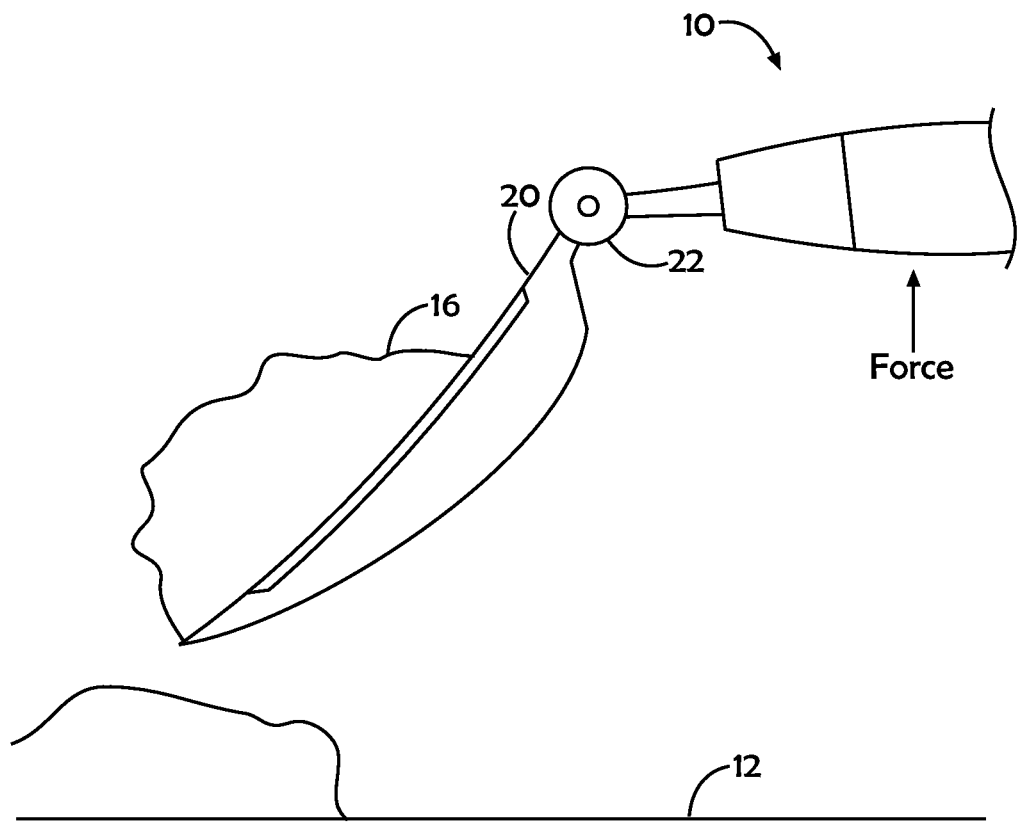
FIGS. 3a through 3e are side views of the spring assisted shovel in use.
Figure 3B:
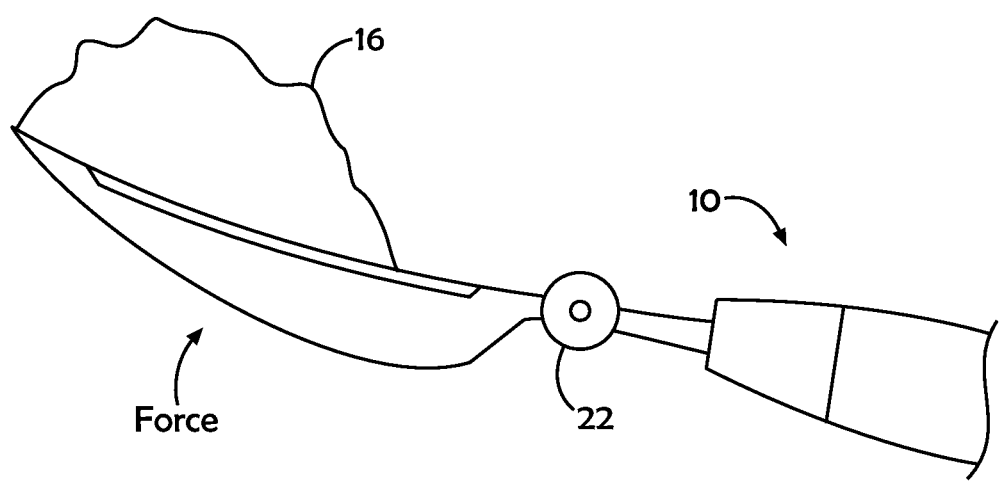
Figure 3C:
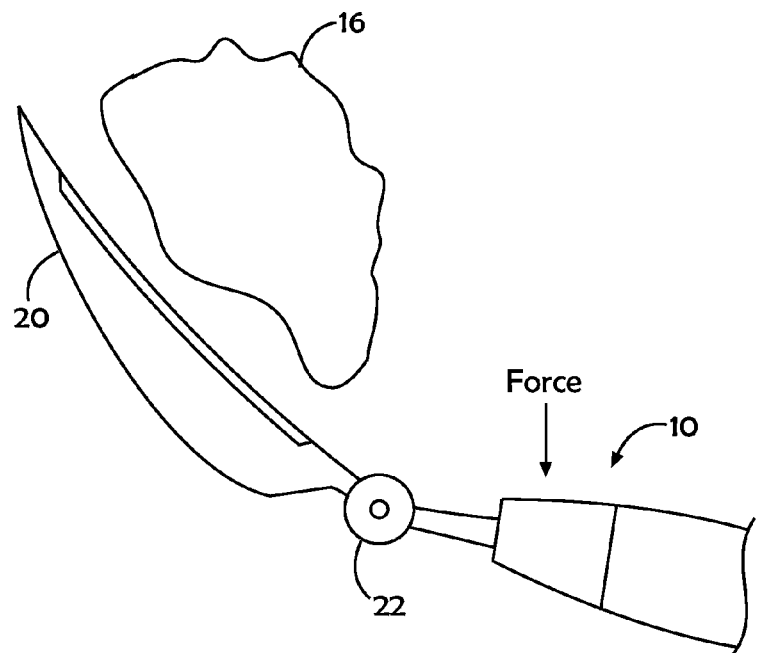
Figure 3D:
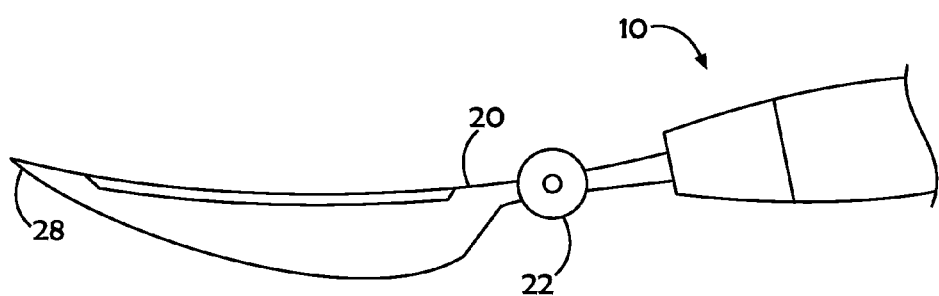

Now referring to FIGS. 3a through 3d, Newton's three laws stated above are shown, with FIG. 3a representing generally constant linear force after initial acceleration, with a portion of the input energy being stored within spring 22. In FIG. 3b, the application of constant force continues, but some of the potential energy stored within spring 22 is converted to kinetic energy as the impulse force remains constant and the extension of spring 22 begins to return to its normal state. The impulse load acceleration applied to the spring 22 is lessened due to constant linear momentum. As the impulse force is lessened and eventually reversed in deceleration, FIG. 3c shows the rebound of blade 20 past its resting position 20a (FIG. 3e), thereby adding stored energy to ejected aggregate pile 16. The combination of mechanisms and forces launches projectiles farther than is achievable using a rigid handle shovel and the equivalent amount of input energy.

Figure 3E:
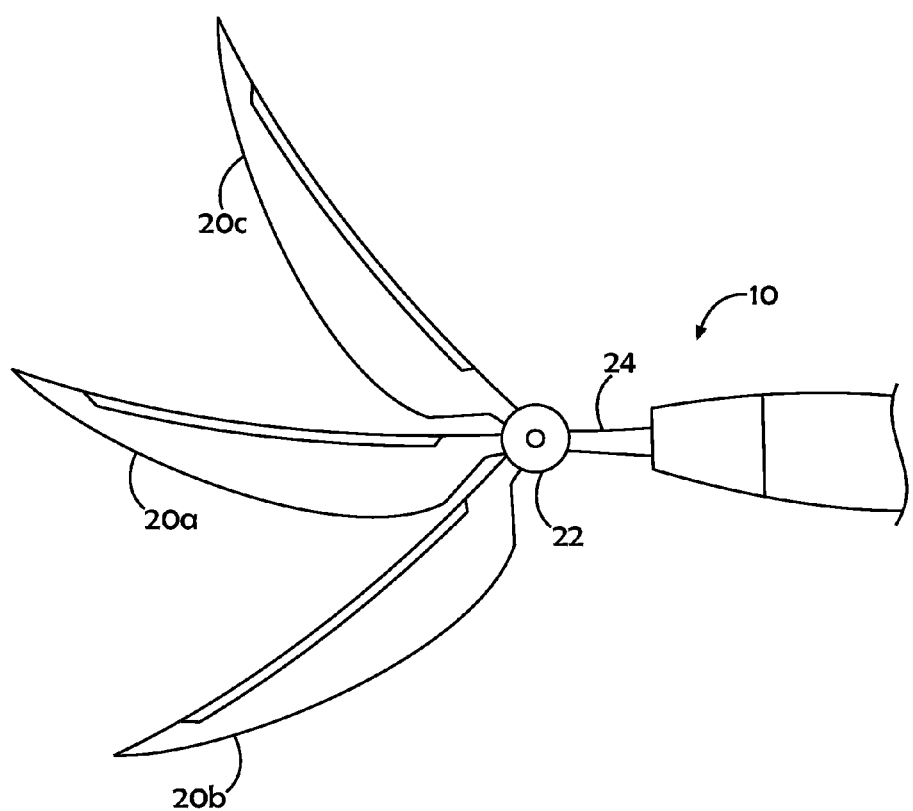

FIG. 3e shows the range of blade 20 motions with the application of forces. The resting or neutral position 20a occurs when shovel 10 is not in use, or during the transition 20b between acceleration and deceleration of FIG. 3a to the equilibrium of FIG. 3b, and the return to rest after launching 20c of FIG. 3c.

Figure 4:
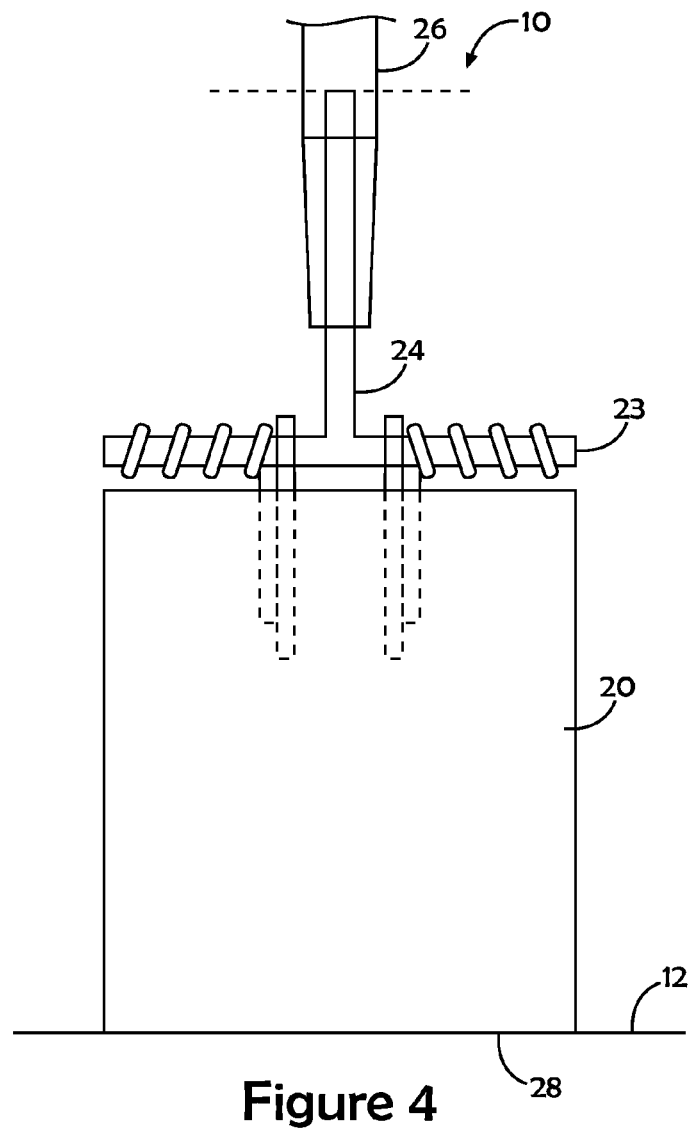
FIG. 4 is a front view of the components of a spring assisted shovel.

Referring now to FIG. 4, there is shown a front view of spring assisted shovel 10, including blade 20, handle 26, and helical torsion spring 22 as main components. Spring 22 is located between handle 26 and blade 20 to facilitate storage and output of potential energy created during the shoveling motion. A blade tip 28 contacts lower surface 12 during use. Spring 22 is located on a hinge shaft 23 of a T-rod 24, which is inserted and captured in handle 26.

Figure 5A:
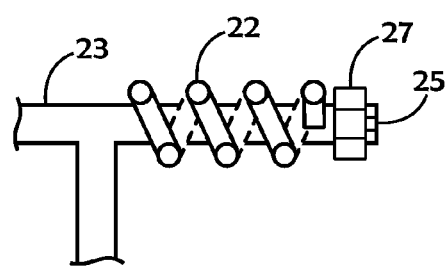
FIGS. 5a through 5d are enlarged detail views of the spring assisted shovel spring assembly of FIG. 4.

FIG. 5a is an enlarged front view of one embodiment of spring 22, having access groove 25 located in hinge shaft 23 to restrain movement of one end of spring 22 while its free end is able to rotate around shaft 23 during use. A stop nut 27 holds spring 22 on shaft 23; removing nut 27 allows replacement springs, not shown, having different spring constants.

Figure 5B:
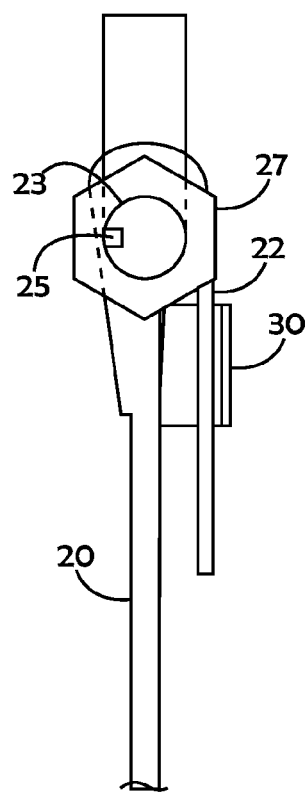
Figure 5C:
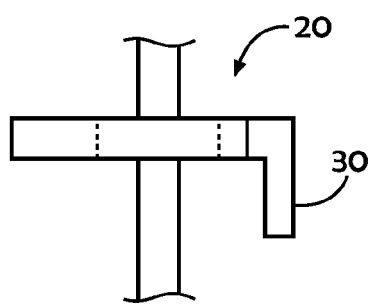
Figure 5D:
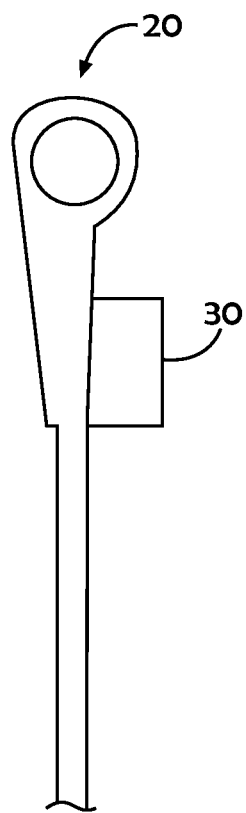

FIG. 5b is an enlarged side view of one embodiment of spring 22, blade 20, and hinge shaft 23. The free end of spring 22 is captured within an engagement channel 30 affixed to the back of blade 20 and provides two degrees of freedom of movement for spring 22 and blade 20 when assembled. FIGS. 5c and 5d are detailed top and side views, respectively, of the engagement channel 30 of blade 20.

Figure 6A:
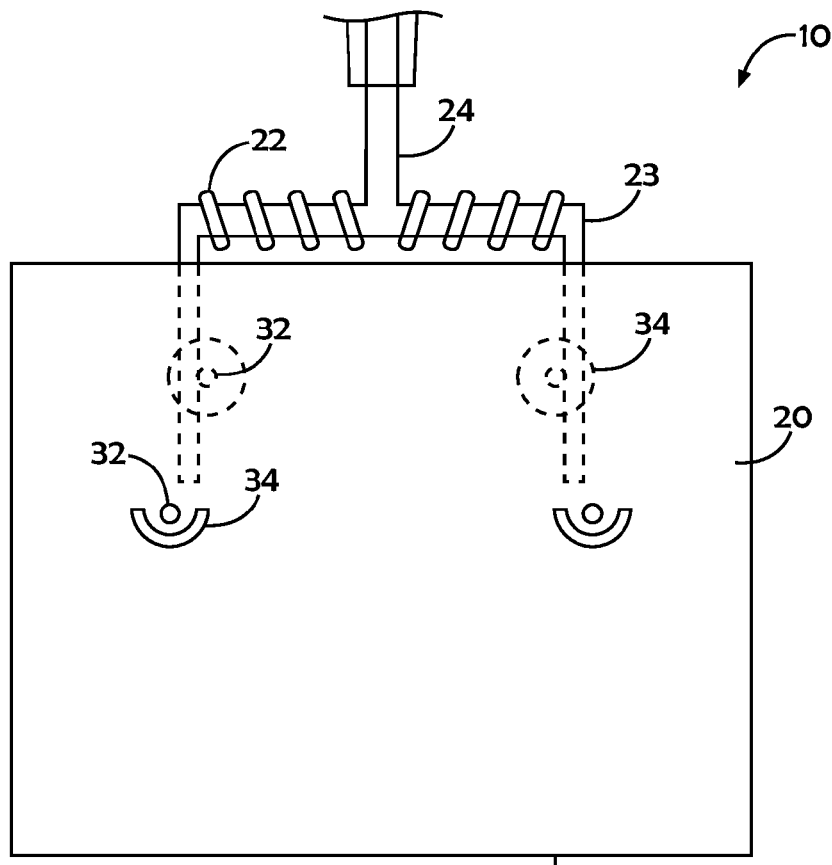
FIGS. 6a and 6b are alternate embodiments of a spring assisted shovel spring assembly.
Figure 6B:
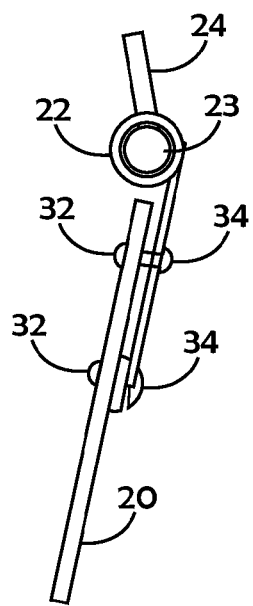

Referring now to FIGS. 6a and 6b, there is shown a front view of an alternate embodiment of spring assisted shovel 10 of FIG. 4, still including blade 20, handle 26, and helical torsion spring 22 as main components. Spring 22 is a one piece spring located between handle 26 and blade 20 to facilitate storage and output of potential energy created during the shoveling motion. Fasteners 32 attach spring 22 to blade 20 providing both energy storage and blade retention. As shown in this embodiment, spring 22 contains bend structures 34 that serve to retain the blade 20 attachment to the handle 24.

Figure 7A:
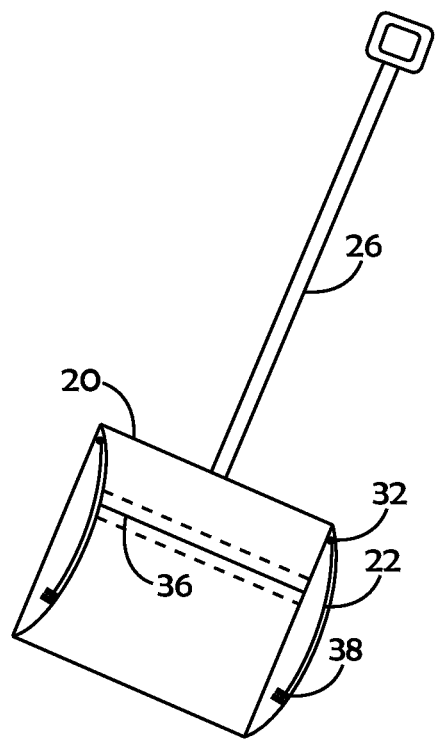
FIGS. 7a and 7b are other alternate embodiments of the shovel of the current invention.
Figure 7B:
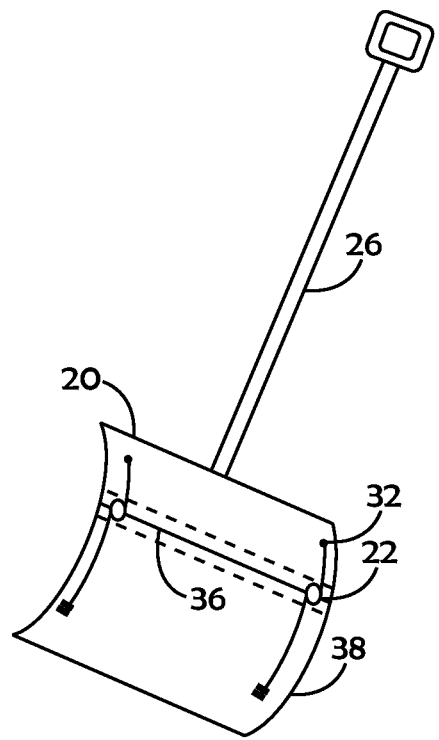

FIGS. 7a and 7b show alternate embodiment front views of the spring assisted shovel 10 of FIGS. 1-3, still including blade 20, handle 26, and helical torsion spring 22 as main components. Spring 22 is a one piece spring located on the vertical edges of blade 20 to facilitate storage and output of potential energy created during the shoveling motion. Blade 20 is bisected horizontally with continuous hinge 36 for pivoting during energy input and output during shoveling. Fasteners 32 attach one end of spring 22 to the upper portion of blade 20, with the free end of spring 22 being restrained within slip joint 38 located on the lower portion of blade 20, where the upper and lower portions are demarcated by hinge 36. Specific location of hinge 36 and springs 22 are dependent on expected usage and may allow for user adjustments during use.

It should be understood that spring assisted shovel 10 may have other shapes. Moreover, blade 20 and handle 26 may take other forms, materials, and embodiments than those shown in the FIGURES. For example, squares, ovals, and rhombi, straight, curved, and ergonomic shapes are all considered within the scope of the blade and handle, respectively, of the present invention.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method of materials movement using spring enhanced human power to increase leverage, the steps comprising:
   a) supplying propulsive force to a spring assisted shovel system for said materials movement, said force being selected from the group: impulse and linear;
   b) modulating said force to said spring assisted shovel system;
   c) applying torque to a helical torsion spring;
   d) capturing potential energy within said helical torsion spring;
   e) varying said force to said spring assisted shovel system;
   f) releasing said potential energy from said helical torsion spring;
   g) applying said potential energy to said spring assisted shovel system; and
   h) applying said potential energy to said materials movement, wherein said application of said potential energy enhances the ballistic trajectory of said materials.

2. The method of claim 1, wherein said modulating said force step (b) comprises a lifting impulse acceleration of said materials on said spring assisted shovel system for a predetermined time.

3. The method of claim 1, wherein said applying torque to said helical torsion spring step (c) further comprises storing a moment arm movement of said helical torsion spring.

4. The method of claim 3, wherein said storing a moment arm movement further comprises storing an initial rotational acceleration of said impulse force of said moment arm.

5. The method of claim 1, wherein said varying said force step (e) further comprises decelerating said supplied force, whereby said captured potential energy from said helical torsion spring is released into said material and applied thereto.

6. The method of claim 1, wherein said enhancement of said ballistic trajectory is concomitantly positively affected by said application of captured potential energy applied thereto, subsequent to the termination of said propulsive force to said material.

7. The method of claim 1, wherein said material is selected from the group: frozen water, granular, conglomerate, organic, and inorganic.

8. In a hand operated shovel system having a handle and a shovel blade, the improvement comprising:
   a) a helical torsion spring operatively connected to said handle;
   b) means operatively connected to said handle for hingedly attaching said shovel blade thereto;
   c) a removably attached retention device on said handle for restraining said helical torsion spring;
   d) means for capturing rotational energy within said helical torsion spring; and
   e) means for releasing stored energy within said helical torsion spring.

9. The hand operated shovel system of claim 8, wherein said means for hingedly attaching said shovel blade to said handle allows bidirectional rotational movement thereof respective to said handle.

10. The hand operated shovel system of claim 8, wherein said removably attached retention device on said handle comprises physical restraint thereto of one end of said helical torsion spring.

11. The hand operated shovel system of claim 10, wherein a free end of said helical torsion spring is operatively connected to said shovel blade.

12. The hand operated shovel system of claim 8, wherein said means for capturing and said means for releasing rotational energy are actuatable by physical movement of said hand operated shovel system.

13. The hand operated shovel system of claim 8, wherein said physical movement is selected from the group: impulse, linear, acceleration, and deceleration.

14. The hand operated shovel system of claim 8, wherein said helical torsion spring is replaceable.

15. The hand operated shovel system of claim 8, wherein said helical torsion spring further comprises means for adjusting said helical torsion spring to accommodate different material loads.

16. The hand operated shovel system of claim 15, wherein said means for adjusting said helical torsion spring comprise a range of spring constants.

17. In a hand operated shovel system having a handle and a shovel blade, the improvement comprising:
   a) a horizontal bisection of said shovel blade having an upper blade section and a lower blade section;
   b) means operatively connected to said bisected shovel blade for hingedly attaching said bisected shovel blades thereto;
   c) a spring operatively connected to said bisected shovel blade sections;
   d) a removably attached retention device on said bisected shovel blade sections for restraining said spring;
   e) means for capturing rotational energy within said spring; and
   f) means for releasing stored energy within said spring.

18. The hand operated shovel system of claim 17, wherein said means for hingedly attaching said bisected shovel blades sections thereto comprises a continuous hinge allowing bidirectional rotational movement thereof said lower blade section respective to said handle.

19. The hand operated shovel system of claim 17, wherein said means for capturing and said means for releasing rotational energy are actuatable by physical movement of said hand operated shovel system.

20. The hand operated shovel system of claim 17, wherein said spring further comprises a range of spring constants.

\* \* \* \* \*